(12) United States Patent
Lombard et al.

(10) Patent No.: US 12,422,355 B2
(45) Date of Patent: Sep. 23, 2025

(54) LIDAR SYSTEM FOR DIFFERENTIAL ABSORPTION AND BACKGROUND DISTANCE MEASUREMENTS

(71) Applicant: OFFICE NATIONAL D'ETUDES ET DE RECHERCHES AÉROSPATIALES, Palaiseau (FR)

(72) Inventors: Laurent Lombard, Palaiseau (FR); Anne Durecu, Palaiseau (FR); Nicolas Cezard, Palaiseau (FR); François Gustave, Palaiseau (FR); Guillaume Canat, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 993 days.

(21) Appl. No.: 17/519,978

(22) Filed: Nov. 5, 2021

(65) Prior Publication Data

US 2022/0146411 A1    May 12, 2022

(30) Foreign Application Priority Data

Nov. 6, 2020   (FR) ..................... 20 11430

(51) Int. Cl.
  *G01N 21/31*   (2006.01)
  *G01S 7/481*   (2006.01)
  *G01S 17/10*   (2020.01)

(52) U.S. Cl.
  CPC ............ *G01N 21/31* (2013.01); *G01S 7/4814* (2013.01); *G01S 17/10* (2013.01); *G01N 2201/06113* (2013.01)

(58) Field of Classification Search
  CPC ......... G01N 21/31; G01N 2201/06113; G01N 2021/1795; G01N 21/3151;
  (Continued)

(56) References Cited

U.S. PATENT DOCUMENTS

| 11,119,044 B2* | 9/2021 | Babin ..................... G01J 3/44 |
| 2010/0131207 A1 | 5/2010 | Lippert et al. |
| 2021/0055391 A1* | 2/2021 | LaChapelle ........... G01S 7/4917 |

FOREIGN PATENT DOCUMENTS

| EP | 1 943 541 | 7/2008 |
| FR | 3 009 655 | 2/2015 |
| WO | 2007/032857 | 3/2007 |

OTHER PUBLICATIONS

French Search Report and Written Opinion of FR Application No. 2011430 dated Jun. 22, 2021, 8 pages.

* cited by examiner

*Primary Examiner* — Md M Rahman
(74) *Attorney, Agent, or Firm* — Maier & Maier, PLLC

(57) ABSTRACT

A LIDAR system is adapted for performing differential absorption measurements of a chemical compound between two distinct optical frequencies ($v1$, $v2$), and for measuring a separation distance from an obstacle which is present in a background of a measurement zone where the absorption occurs. An emission optical power value is varied between different time intervals during a radiation emission sequence, in order to allow that the LIDAR system implements an optical fiber technology while having sufficient emission power. The LIDAR system makes it possible to evaluate an amount of the chemical compound which is contained in the measurement zone, as well as a separation distance from an obstacle which is located in the background of the measurement zone.

20 Claims, 9 Drawing Sheets

(58) Field of Classification Search
CPC ......... G01N 2201/0691; G01N 21/474; G01N 2021/4742; G01S 7/4814; G01S 17/10; G01S 7/4802; G01S 7/4815; G01S 17/95; G01S 7/484; G01S 17/88; Y02A 90/10
USPC ........................................................ 356/432
See application file for complete search history.

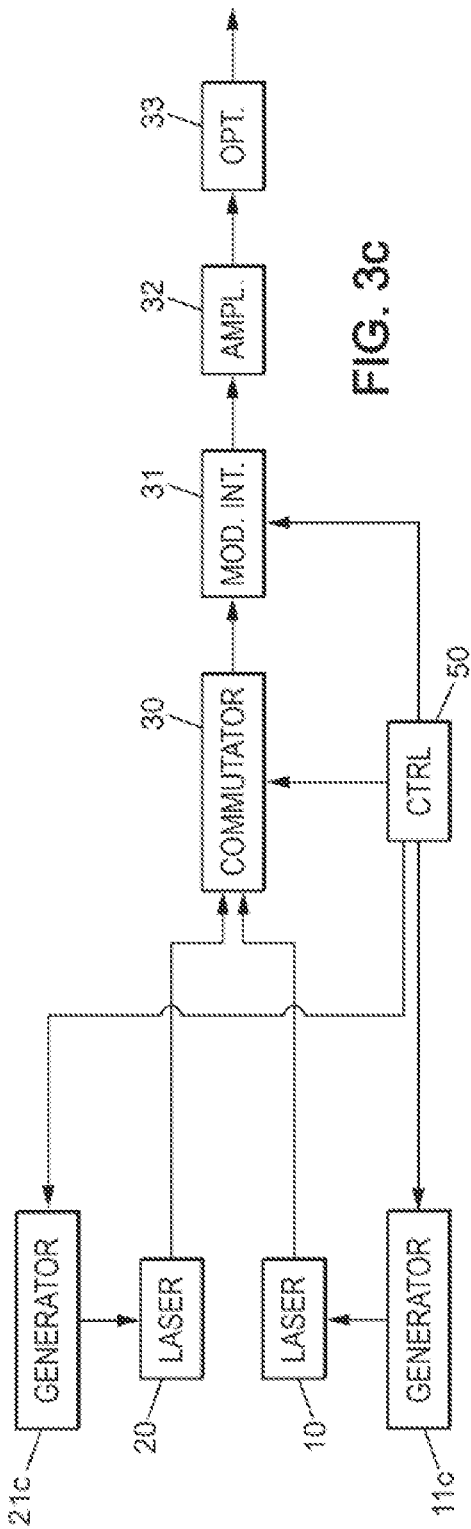
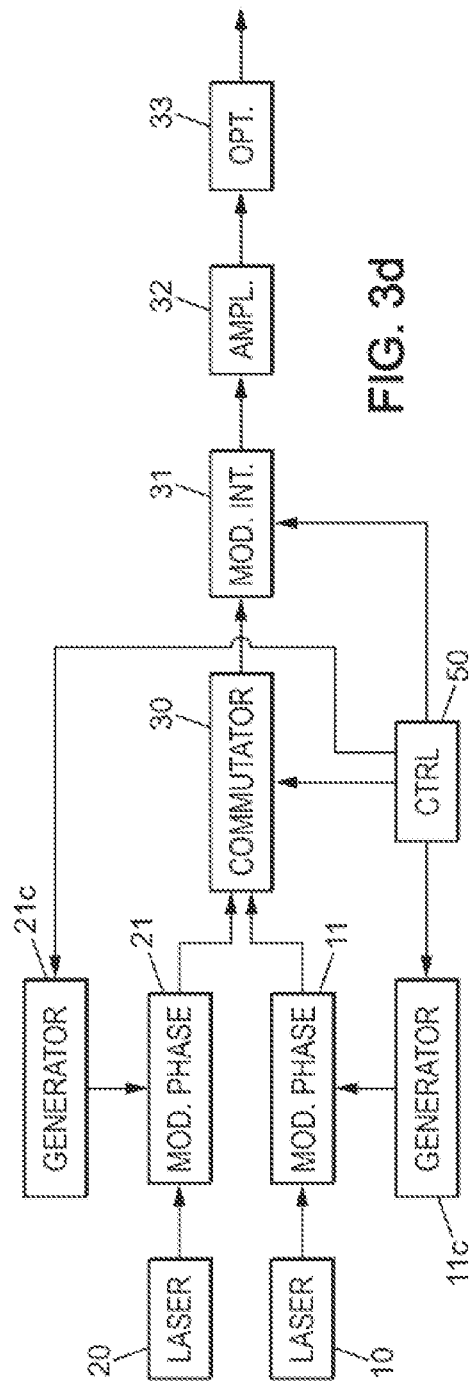

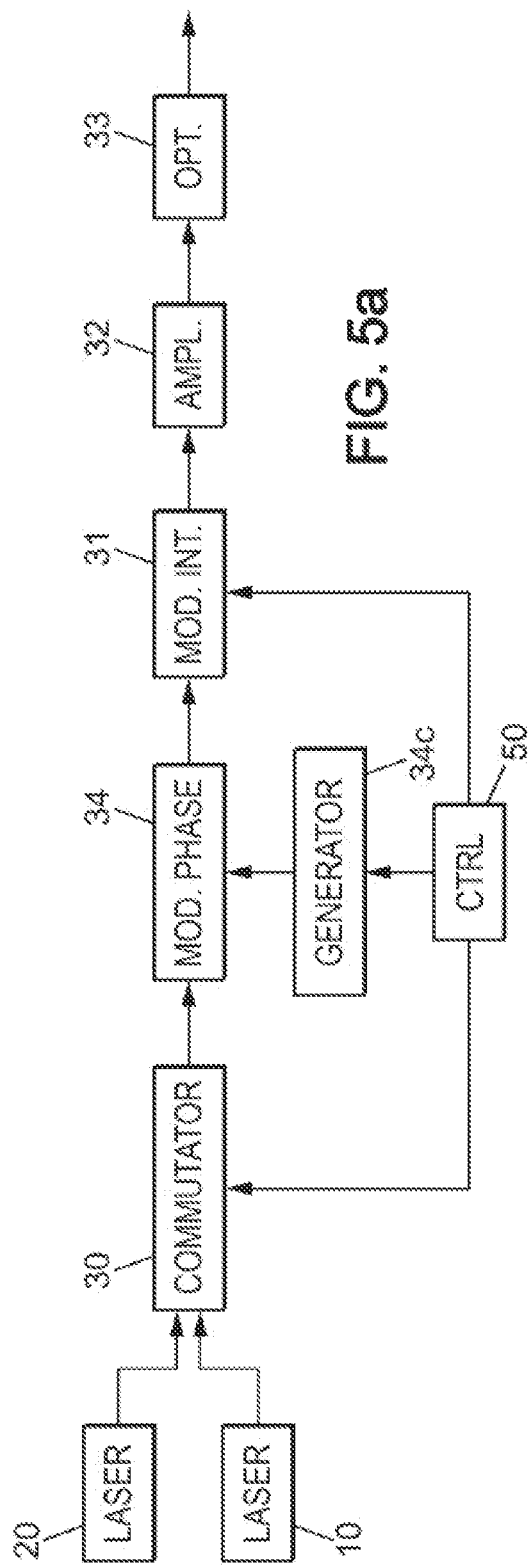
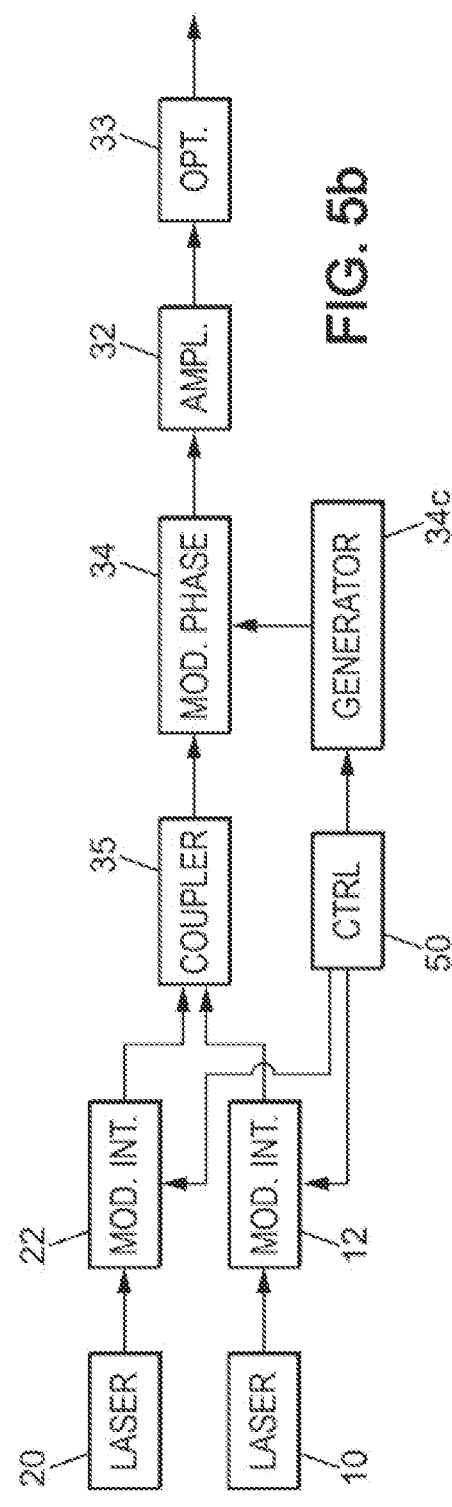

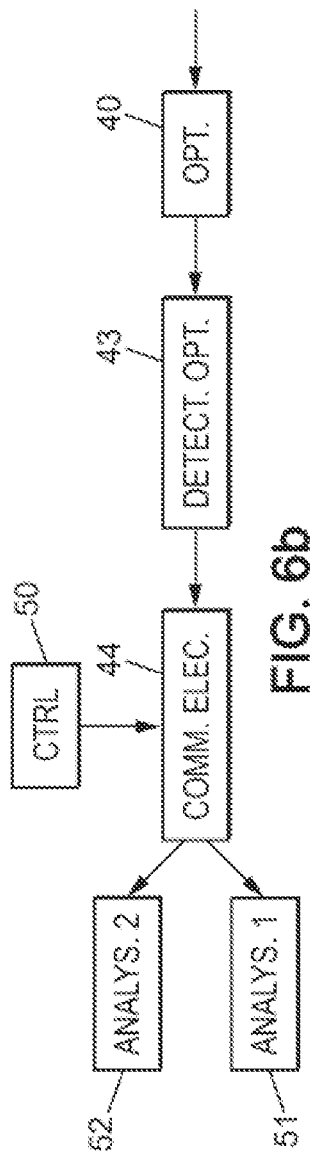
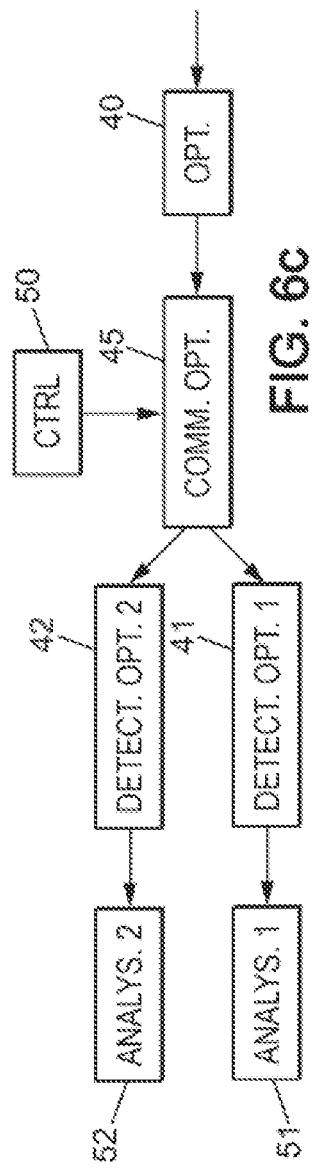
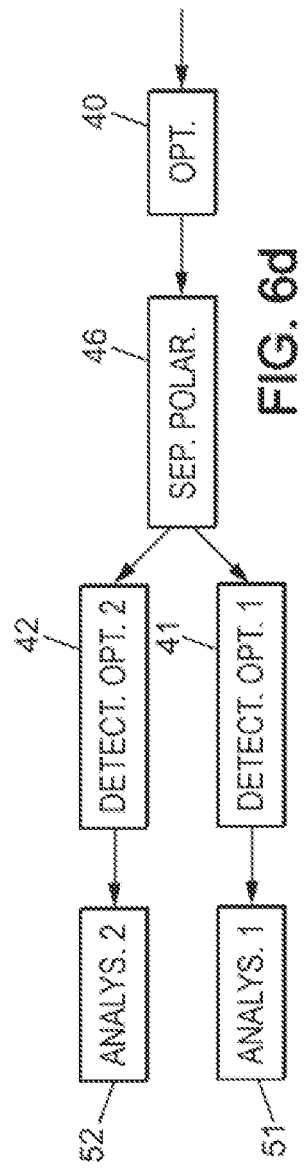

LIDAR SYSTEM FOR DIFFERENTIAL ABSORPTION AND BACKGROUND DISTANCE MEASUREMENTS

This application claims priority to FR Patent Application No. 20 11430 filed Nov. 6, 2020, the entire contents of which are hereby incorporated by reference.

BACKGROUND OF THE INVENTION

Field of the Invention

This description relates to a LIDAR system which is suitable for carrying out differential absorption measurements and background distance measurements. It also relates to a method for measuring an amount of a chemical compound, which uses such a system.

Description of the Related Art

It is known using differential absorption measurements to assess the amount of a chemical compound that is contained in a measurement zone. To this purpose, the absorption of a radiation emitted toward the measurement zone is measured for a first frequency of the radiation which does not correspond to an absorption band of the chemical compound, and also for a second frequency of the radiation which does correspond to an absorption band of the chemical compound. It is therefore necessary to emit radiation at both frequencies toward the measurement zone, and to compare the absorption levels that are measured for each frequency. Such a measurement method is commonly referred to as IPDA, for "Integrated Path Differential Absorption". It also requires knowing the depth of the measurement zone, such as, for example, the distance at which an obstacle is located which is present in the background of this measurement zone.

Performing such IPDA measurements using a LIDAR system is advantageous, in particular because of the detection sensitivity and the capability of analyzing detection signals that such a system provides. It is therefore an important issue to be able to use LIDAR systems made from optical fibers, due to the reduced size and weight of such systems, their better energy efficiency, and their robustness in resisting a loss of alignment between the optical components of which they are composed.

However, the IPDA measurements need to satisfy the following requirements:
at least two radiations must be able to be emitted with different optical frequency values, in sufficiently rapid succession relative to variations which can affect the content of the measurement zone. More precisely, pulses of both radiations must be emitted at a repetition frequency which is sufficiently high relative to the variations in content of the measurement zone, and to allow analysis of the detection signals, for example at a repetition frequency which is greater than 1 kHz (kilohertz);
both radiations, the one outside the absorption bands of the chemical compound being measured, and the one which corresponds to one of its absorption bands, must be emitted with sufficient respective energies;
the radiation which corresponds to one of the absorption bands of the chemical compound must have sufficiently narrow spectral linewidth to provide sufficient accuracy when determining the absorption by the chemical compound. In particular, it may be necessary for this spectral width of the radiation which corresponds to one of the absorption bands of the chemical compound to be less than 100 MHz (megahertz), when the central wavelength of this radiation is about 1.6 µm (micrometer); and
the measurement of the separation distance for a background obstacle, by characterizing the time-of-flight, requires using radiation pulses which are quite short, typically of individual durations which are less than about 100 ns (nanosecond).

But the well-known phenomenon of stimulated Brillouin scattering which occurs in the optical fibers, limits the peak power of the radiation pulses which can be emitted by LIDAR systems made from optical fibers. This results in a limitation on the maximum range distance of these optical fiber LIDAR systems.

SUMMARY OF THE INVENTION

Taking these constraints into account, an object of the present invention is to provide a novel LIDAR system which makes it possible both to perform IPDA measurements and to determine the separation distance from an obstacle which is present in the background of the measurement zone, and which can be achieved using optical fibers.

More particularly, the invention aims at providing such a LIDAR system which is implemented using at least one optical fiber to transmit the emitted radiations, but for which the peak power limitation which is caused by the stimulated Brillouin scattering is extended or eliminated.

To achieve this or other objects, a first aspect of the invention provides a LIDAR system which is adapted for performing differential absorption measurements between two distinct optical frequencies, and measurements of a separation distance from an obstacle which is present in a background of a measurement zone where the absorption occurs. This LIDAR system of the invention comprises:
a laser source assembly, which is suitable for producing radiation at either of the two optical frequencies;
intensity modulation means, which are adapted for applying a pulse envelope shape to each radiation, including a pulse duration and a pulse optical power value; and
an emission controller, which is adapted for controlling the intensity modulation means.

In the context of the invention, pulse optical power is understood to mean a value which characterizes the intensity of each pulse, this value possibly corresponding to a peak power of the pulse, or an average power which is evaluated over the entire duration of the pulse, it being understood that the peak power value and the average power value increase one as a function of the other at constant duration and pulse shape.

According to the invention, the LIDAR system is adapted so that, during an operation of this LIDAR system, it emits, in a target direction in which a measurement of the differential absorption and a measurement of the separation distance from the background obstacle are to be performed, a radiation emission sequence which comprises:
first time intervals during which the radiation emission is spectrally located at a first of the two optical frequencies, with a first spectral width, a first pulse duration, and a first pulse optical power value; and
second time intervals during which the radiation emission is spectrally located at the second of the two optical frequencies, with a second spectral width, a second pulse duration, and a second pulse optical power value.

The first and second time intervals may form any succession in the radiation emission sequence, with any number of first time intervals between two second time intervals, and vice versa. Additionally or alternatively, the radiation emission sequence may comprise any number of pulses located around the first optical frequency, between two pulses located around the second optical frequency, and vice versa.

In addition, the radiation emission sequence has the following characteristics:
- the first and second spectral widths are such that the radiation emission during the first time intervals and during the second time intervals corresponds to spectral intervals which are disjoint, the first spectral width being greater than the second spectral width,
- the first pulse optical power value is greater than the second pulse optical power value, and
- the first pulse duration being shorter than the second pulse duration.

Such LIDAR system may be made from optical fibers, and in particular its laser source assembly may be of the MOPFA type, for "Master Oscillator Power Fiber Amplifier". For this MOPFA type of LIDAR systems, radiation pulses are first produced which have the desired spectral widths and are modulated according to the desired envelope shapes, and which are separate between successive pulses, then these pulses are amplified before being emitted to the exterior.

Thanks to the first spectral width being greater than the second spectral width, the first pulse optical power value can be chosen to be high or very high without the stimulated Brillouin scattering effect, which would appear in optical fibers used to create such a LIDAR system, interfering with the operation or use of this system.

For use in IPDA measurement, the radiation emission during the first time intervals is chosen to be outside the absorption bands of the chemical compound concerned by the measurements. This radiation emission during the first time intervals is further used to estimate the separation distance from the obstacle which is present in the background of the measurement zone. This telemetric measurement is made by determining the time-of-flight of the radiation pulses that are emitted during the first time intervals, for the round trip between the LIDAR system and the background obstacle. During these first time intervals, the high pulse optical power enabled by the greater spectral width, and the shorter pulse duration, allow greater accuracy in estimating the separation distance from the background obstacle. The radiation emission during the second time intervals is chosen to be within one of the absorption bands of the chemical compound. During the second time intervals, the lower spectral width of the pulses provides greater accuracy in estimating the amount of the chemical compound. The amount of the chemical compound is estimated based on the absorption ratio determined by the LIDAR system, between the radiations emitted during the second time intervals around the second optical frequency and those emitted during the first time intervals around the first optical frequency, and taking into account the estimated value for the separation distance from the background obstacle.

Preferably, one or more of the following features may be selected by the emission controller:
- a repetition frequency of the radiation emission sequence may be between 1 kHz and 50 kHz;
- the first time intervals may have an individual duration of between 10 ns and 200 ns, preferably between 50 ns and 100 ns;
- the second time intervals may have an individual duration of between 0.1 μs (microsecond) and 10 μs, preferably between 0.5 μs and 5 μs;
- the first spectral width of the radiation emitted by the LIDAR system in the measurement zone, during the first time intervals, may be between 100 MHz and 2000 MHz, preferably between 500 MHz and 1000 MHz; and
- the second spectral width of the radiation emitted by the LIDAR system in the measurement zone, during the second time intervals, may be between 10 MHz and 200 MHz, preferably between 50 MHz and 100 MHz.

Finally, the laser source assembly may be adapted so that the radiation emitted by the LIDAR system in the measurement zone has first and second optical frequency values, respectively during the first and second time intervals, which correspond to wavelengths between 1.3 μm and 1.8 μm, in particular between 1.5 μm and 1.6 μm, or which are located around 2 μm. Such wavelength domains are suitable in particular for measuring the amount of carbon dioxide contained in the measurement zone.

In addition, the LIDAR system of the invention comprises a detection path which is suitable for independently detecting, processing, and analyzing backscattered radiations which correspond to the first optical frequency and to the second optical frequency, and which respectively correspond to emissions during the first and second time intervals.

Possibly, the LIDAR system may further comprise a computing unit which is connected at its input to at least one output of the detection path. This computing unit is adapted for providing estimates of the separation distance from the background obstacle and of the amount of the chemical compound contained in the measurement zone, based on analysis signals produced by the detection path.

Depending on different embodiments which are possible for the invention, and in particular depending on different types of laser oscillators used in the laser source assembly to produce the radiations at each of the two optical frequencies, the first and/or second spectral width may be intrinsic or produced by dedicated spectral broadening means. Intrinsic spectral width is understood to mean the spectral width of the radiation as produced by the corresponding laser oscillator. Put another way, in the first case, the spectral width of the pulses emitted during the first and/or second time intervals corresponds to the spectral width of the corresponding laser oscillator. Otherwise, the LIDAR system further comprises:
- spectral broadening means, which are arranged to modify the spectral width of at least one of the radiations produced by the laser source assembly.

In first embodiments of the invention, the emission controller may be adapted for controlling the laser source assembly, the intensity modulation means, and where appropriate the spectral broadening means, so that, in the radiation emission sequence, the first of the two optical frequencies is associated exclusively with the first spectral width, the first pulse duration, and the first pulse optical power value, excluding the second spectral width, the second pulse duration, and the second pulse optical power value, within first radiation pulses, and the second of the two optical frequencies is associated exclusively with the second spectral width, the second pulse duration, and the second pulse optical power value, excluding the first spectral width, the first pulse duration, and the first pulse optical power value, within second radiation pulses which are separate from the first pulses.

For such first embodiments, the LIDAR system may have an arrangement where the laser source assembly comprises a first laser oscillator which is suitable for producing the radiation at the first optical frequency, and a second laser oscillator which is suitable for producing the radiation at the second optical frequency with the second spectral width. The spectral broadening means then comprise a phase modulator which is arranged in a path of the radiation produced by the first laser oscillator, and which is controlled by the emission controller to provide the first spectral width to this radiation produced by the first laser oscillator. In addition, the LIDAR system further comprises an optical switch which is controlled by the emission controller to transmit either the radiation originating from the phase modulator or the radiation produced by the second laser oscillator, to an emission optical path downstream portion which is shared by these radiations originating from the phase modulator and produced by the second laser oscillator, this emission optical path downstream portion comprising the intensity modulation means.

According to another arrangement which is also possible for the first embodiments of the invention, the laser source assembly similarly comprises a first laser oscillator which is adapted for producing the radiation at the first optical frequency, and a second laser oscillator which is adapted for producing the radiation at the second optical frequency with the second spectral width. The spectral broadening means comprise again a phase modulator which is arranged in a path of the radiation produced by the first laser oscillator, and which is controlled by the emission controller to provide the first spectral width to this radiation produced by the first laser oscillator. But in this other arrangement, the intensity modulation means comprise a first intensity modulator which is arranged in a path of the radiation originating from the phase modulator, and which is controlled by the emission controller to be effective on this radiation coming from the phase modulator. The means further comprise a second intensity modulator which is arranged in a path of the radiation produced by the second laser oscillator, and which is controlled by the emission controller to be effective on this radiation produced by the second laser oscillator. Then, the LIDAR system further comprises an optical coupler suitable for transmitting the radiations originating from the first and second intensity modulators to an emission optical path downstream portion which is shared by these radiations originating from the first and second intensity modulators.

For these two arrangements, the emission optical path downstream portion may comprise an optical radiation amplifier, or an optical radiation amplification chain, which is controlled by the emission controller to produce the first and second optical power values according to the features of the invention for the radiation emission sequence.

In second embodiments of the invention, which are alternatives to the above first embodiments, the emission controller may be adapted for controlling the laser source assembly, the spectral broadening means, and the intensity modulation means, so that the radiation emission sequence comprises a succession of radiation pulses which are spectrally located either at the first of the two optical frequencies, or at the second of the two optical frequencies, all the radiation pulses having the same envelope shape which comprises, for the first optical frequency as for the second optical frequency, a first duration during which the radiation emission has the first spectral width and the first optical power value, and a second duration during which the radiation emission has the second spectral width and the second optical power value, the first duration being shorter than the second duration, and being before or after this second duration in each radiation pulse.

In general for the invention, the LIDAR system may implement an optical fiber technology.

Also in general for the invention, the LIDAR system may comprise polarization means adapted so that the radiations emitted toward the measurement zone by this LIDAR system have polarizations which are orthogonal, in particular circular polarizations which are opposite, when these radiations are emitted during the first time intervals or the second time intervals. In this case, the detection path may comprise a polarizing beamsplitter which is arranged to transmit the backscattered radiations, as a function of the polarizations of these backscattered radiations, either to a first detector which is sensitive in a first spectral interval including the first optical frequency combined with the first spectral width, or to a second detector which is sensitive in a second spectral interval including the second optical frequency combined with the second spectral width. Possibly, the two detectors may be identical if their common spectral interval of sensitivity includes both the first optical frequency combined with the first spectral width and the second optical frequency combined with the second spectral width.

A second aspect of the invention provides a method for measuring an amount of a chemical compound which is present in a target direction, wherein:
  a LIDAR system in accordance with the first aspect of the invention is selected, such that the chemical compound has an absorption capacity value which is lower at the first optical frequency than at the second optical frequency;
  the LIDAR system is oriented in the target direction in order to emit radiation according to the radiation emission sequence towards a measurement zone which is likely to contain the chemical compound, and an operation of the LIDAR system is triggered;
  the separation distance from the obstacle which is present in the background of the measurement zone is estimated based on the backscattered radiation relating to the first optical frequency and which corresponds to emissions during the first time intervals; and
  the amount of the chemical compound which is contained in the measurement zone, integrated over the path of the pulses between the LIDAR system and the background obstacle, is estimated based on intensity values relating separately to the backscattered radiation at the first optical frequency and at the second optical frequency, respectively corresponding to the first and second time intervals in the radiation emission sequence, these backscattered radiations having been detected by the detection path of the LIDAR system.

Preferably, the separation distance from the obstacle which is present in the background of the measurement zone may be estimated based on a time-of-flight which is measured for the backscattered radiation relating to the first optical frequency. In this case, this separation distance, as estimated based on the backscattered radiation relating to the first optical frequency, can be used to estimate the amount of the chemical compound integrated over the path of the pulses which is contained in the measurement zone, in combination with the intensity values separately relating to the backscattered radiations detected at the first optical frequency and at the second optical frequency, and respectively corresponding to the emissions during the first and second time intervals.

The chemical compound which is concerned by the measurement method of the invention may be any among carbon dioxide or $CO_2$, methane or $CH_4$, nitrous oxide or $N_2O$, and water or $H_2O$.

Finally, different conditions for implementing the invention may be as follows:

for first implementation conditions, the LIDAR system may be installed at the surface of the Earth and directed to measure the amount of the chemical compound which is present between this LIDAR system and the obstacle;

for second implementation conditions, the LIDAR system may be on board an aircraft in flight, and directed towards a geographical area at the surface of the Earth, to measure the separation distance from the surface of the Earth in this geographical area relative to the LIDAR system, and to measure the amount of the chemical compound which is present between the LIDAR system and the surface of the Earth in the same geographical area; and for third implementation conditions, the LIDAR system may be on board a satellite in orbit around the Earth and directed towards a geographical area at the surface of the Earth, to measure the separation distance from the surface of the Earth in this geographical area relative to the LIDAR system, and to measure the amount of the chemical compound which is present between the LIDAR system and the surface of the Earth in the same geographical area.

For the second and third implementation conditions, the surface of the Earth in the geographical area towards which the LIDAR system is directed, serves as the obstacle present in the background of the measurement area.

BRIEF DESCRIPTION OF THE DRAWINGS

The features and advantages of the invention will be more clearly apparent in the following detailed description of some non-limiting embodiments, with reference to the appended figures, among which:

FIG. 1b shows emission optical power variations for the first radiation emission sequence of FIG. 1a;

FIG. 2b shows emission optical power variations for the second radiation emission sequence of FIG. 2a;

FIG. 3c is a block diagram of a second variant of the emission path compared to the system of FIG. 3a, for yet another LIDAR system according to the invention, again for producing the first radiation emission sequence of FIG. 1a and FIG. 1b;

FIG. 3d is a block diagram of a third variant of the emission path compared to the system of FIG. 3a, for yet another LIDAR system according to the invention, again for producing the first radiation emission sequence of FIG. 1a and FIG. 1b;

FIG. 5a is a block diagram of an emission path for yet another LIDAR system according to the invention, which is adapted for producing the second radiation emission sequence of FIG. 2a and FIG. 2b;

FIG. 5b is a block diagram of a variant of the emission path compared to the system of FIG. 5a, for yet another LIDAR system according to the invention, and which is again adapted for producing the second radiation emission sequence of FIG. 2a and FIG. 2b;

FIG. 6b is a block diagram of a variant of the detection path compared to the system of FIG. 6a;

FIG. 6c is a block diagram of another variant of the detection path compared to the system of FIG. 6a; and FIG. 6d is a block diagram of yet another variant of the detection path compared to the system of FIG. 6a.

DESCRIPTION OF THE PREFERRED EMBODIMENTS

For clarity sake, the dimensions of the elements represented in FIG. 1a, FIG. 1b, FIG. 2a, and FIG. 2b correspond neither to actual dimensions, nor to actual dimension ratios. In addition, all elements are only represented symbolically in the figures, and identical references which are indicated in different figures designate identical elements or those which have identical functions.

Figure 1A:
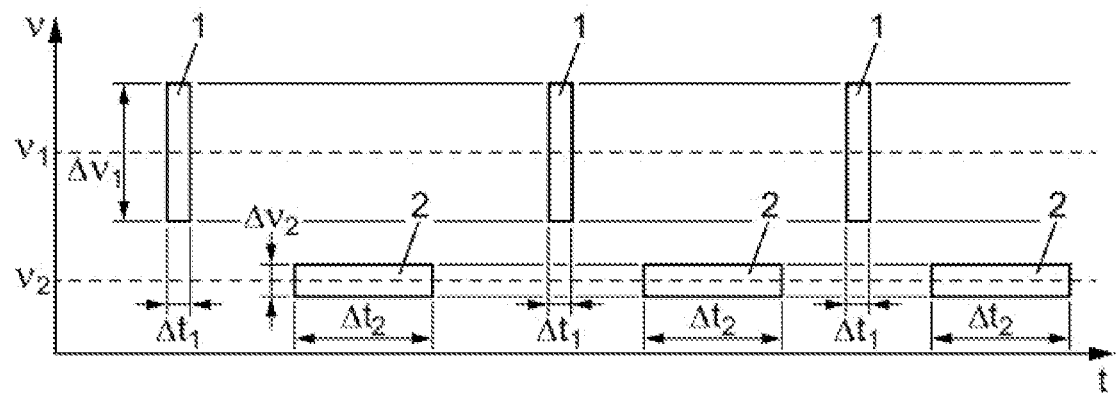
FIG. 1a shows spectral variations of a first radiation emission sequence as implemented in possible first embodiments of the invention.
Figure 1B:
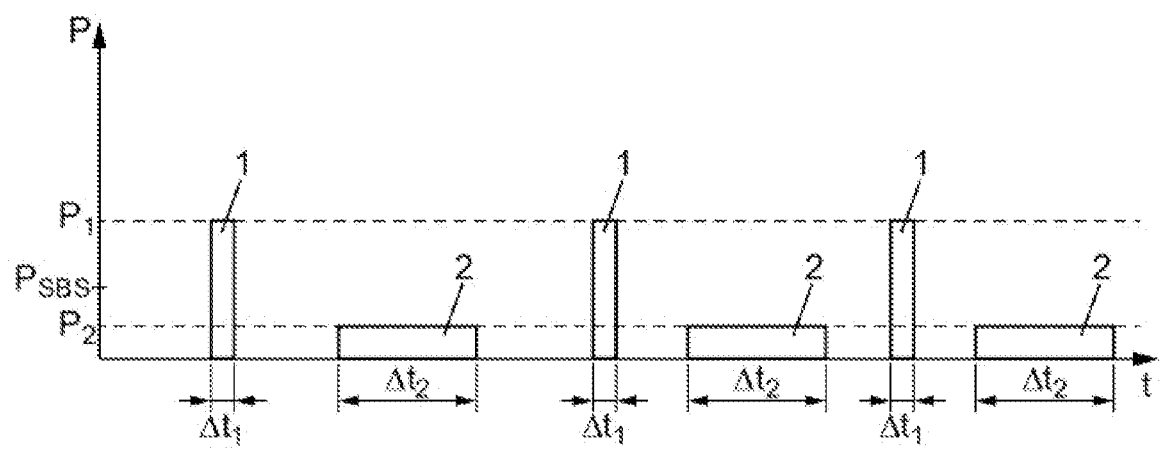
Figure 2A:
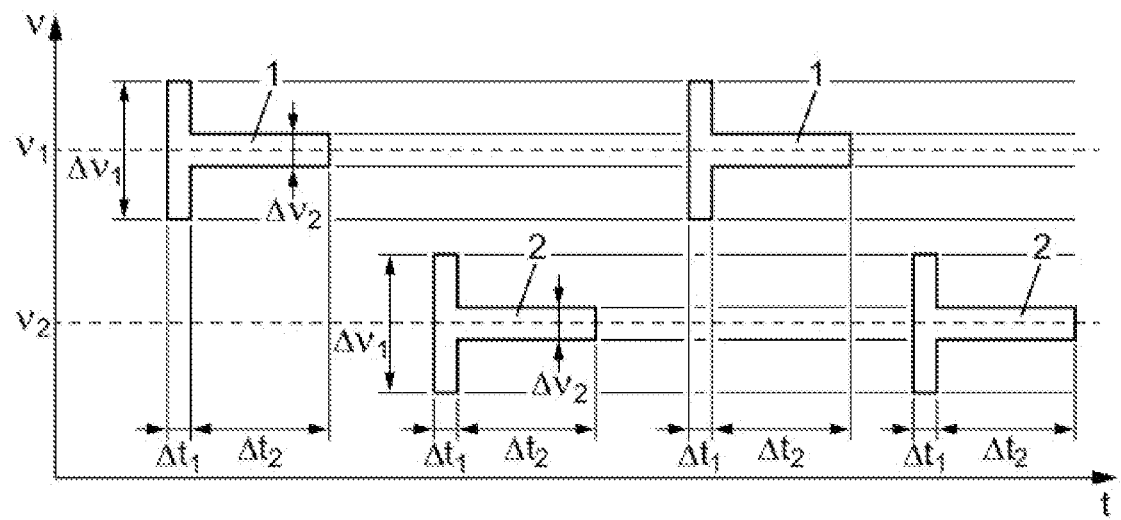
FIG. 2a shows spectral variations of a second radiation emission sequence as implemented in possible second embodiments of the invention.

In the diagrams of FIG. 1a, FIG. 1b, FIG. 2a, and FIG. 2b, the x axis identifies the time, denoted t, during radiation emission sequences which are composed of radiation pulses spectrally located either around a first optical frequency, denoted $v_1$, or around a second optical frequency, denoted $v_2$. $\Delta t_1$ and $\Delta t_2$ respectively denote durations of the first and second time intervals during these radiation emission sequences. In FIG. 1a and FIG. 2a, the y axis identifies the values of the optical emission frequency, denoted v, for each time of the emission sequence concerned, and in FIG. 2a and FIG. 2b, the y axis identifies the instantaneous emission power of the radiation, denoted P. In general, the radiation pulses which are designated by the reference 1 are spectrally located around optical frequency $v_1$, and are all assumed to be identical to each other. Similarly, the radiation pulses which are designated by the reference 2 are spectrally located around optical frequency $v_2$, and are also all assumed to be identical to each other. For the application of the invention to measurements of differential absorption of a chemical compound between two distinct optical frequencies, all the radiation pulses 1 and 2 are emitted in the direction of a measurement zone which is likely to contain an amount to be determined of the chemical compound. Optical emission frequency $v_1$ is intended to be selected outside the absorption bands of the chemical compound, and optical emission frequency $v_2$ is intended to be selected within one of the absorption bands of this chemical compound. In the case where the chemical compound concerned is carbon dioxide, optical emission frequency $v_1$ may be chosen as equal to 190.81 THz, corresponding to a wavelength value $\lambda_1$ equal to 1572.2 nm, and optical transmission frequency $v_2$ may be chosen as equal to 190.84 THz, corresponding to a wavelength value $\lambda_2$ equal to 1572.02 nm.

FIG. 1a and FIG. 1b relate to a same first radiation emission sequence which is possible for implementing the invention. In such a first emission sequence, all of radiation pulses 1 have first common values of spectral width $\Delta v_1$ and of emission peak power $P_1$, and have a pulse duration equal to $\Delta t_1$. Similarly, all of radiation pulses 2 of this same emission sequence have second common values of spectral width $\Delta v_2$ and of emission peak power $P_2$, and have a pulse duration equal to $\Delta t_2$. The emission peak power values $P_1$ and $P_2$ correspond to the radiation emitted by a LIDAR system according to the invention, such that this emission radiation exits the LIDAR system in the direction of the measurement zone, in particular after final optical amplification inside the LIDAR system. For this first radiation emission sequence, pulses 1, of individual durations $\Delta t_1$, correspond to the first time intervals as introduced in the general part of this description, and pulses 2, of individual durations $\Delta t_2$, correspond to the second time intervals. Thanks to the spectral broadening which is greater for pulses 1 compared to pulses 2, i.e. $\Delta v_1 > \Delta v_2$, the emission peak power value $P_1$ can be greater than the power limit due to the stimulated Brillouin scattering, denoted $P_{SBS}$, which occurs in optical fibers of the LIDAR system, while the emission peak power value $P_2$ can be less than this same power limit $P_{SBS}$.

Figure 2B:
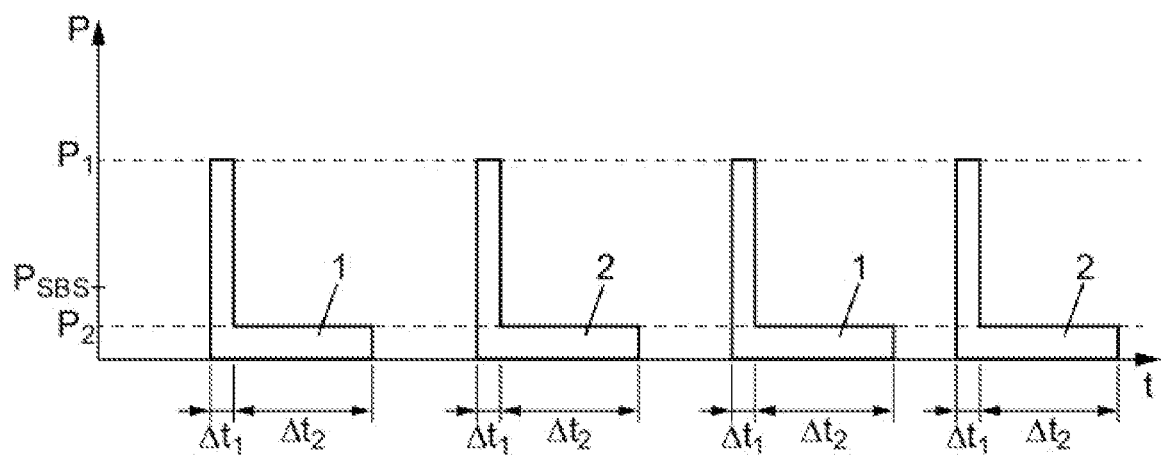

FIG. 2a and FIG. 2b relate to a same second radiation emission sequence which is also possible for implementing the invention. In such a second emission sequence, all the radiation pulses 1 and 2 which are emitted toward the measurement zone likely to contain the amount to be determined of the chemical compound, have the same envelope shape, which is transposed at the optical frequency of each pulse, the latter alternating between $v_1$ for pulses 1 and $v_2$ for pulses 2. This envelope shape comprises, within each pulse 1, 2, a first time interval of duration $\Delta t_1$ during which the radiation of pulse 1 or 2 has spectral width value $\Delta v_1$ and emission peak power value $P_1$, and a second time interval of duration $\Delta t_2$ during which the radiation of pulse 1 or 2 has spectral width value $\Delta v_2$ and emission peak power value $P_2$. The chronological order between the first and second time intervals, each with its associated values for the spectral width and emission peak power, may be reversed within each pulse, and the first and second time intervals may possibly also be separated by an intermediate envelope pattern shape within each pulse. As above, the power limit $P_{SBS}$ which is associated with a stimulated Brillouin scattering effect can be less than emission peak power value $P_1$ and greater than emission peak power value $P_2$.

For the first emission sequence (FIG. 1a and FIG. 1b) as for the second emission sequence (FIG. 2a and FIG. 2b), the radiation emissions at optical frequency $v_1$ during durations $\Delta t_1$ are used to determine the separation distance from the background obstacle. In the case of the second radiation emission sequence, the portions of pulses 1 which correspond to durations $\Delta t_2$, with spectral width value $\Delta v_2$ and emission peak power value $P_2$, can possibly not be used to estimate the separation distance from the background obstacle. However, the portions of pulses 2 which correspond to durations $\Delta t_1$, with spectral width value $\Delta v_1$ and emission peak power value $P_1$, can optionally be used in addition to the portions of pulses 1 which correspond to durations $\Delta t_1$ in order to determine the separation distance from the background obstacle.

A generalization of the second pulse sequence can be that each pulse 1 or 2, respectively around optical frequency $v_1$ or $v_2$, exhibits a steep rising edge in optical power, which is spectrally wide and which makes it possible to perform the telemetric measurement, followed by a decrease in optical power which is slow and spectrally narrow, suitable for differential absorption measurement.

For these two radiation emission sequences, respectively according to FIG. 1a and FIG. 1b for the first, and according to FIG. 2a and FIG. 2b for the second, the following numerical values are given as a non-limiting example:
 the pulse repetition frequency can be between 1 kHz (kilohertz) and 50 kHz,
 $\Delta t_1$ can be between 50 ns and 100 ns,
 $\Delta t_2$ can be between 0.5 µs and 5 µs,
 $\Delta v_1$ can be between 500 MHz and 1000 MHz,
 $\Delta v_2$ can be between 50 MHz and 100 MHz,
 $P_1$ can be greater than 200 W, and
 $P_2$ can be greater than 50 W.

Thus, duration $\Delta t_1$ of the first time intervals can be shorter than duration $\Delta t_2$ of the second time intervals. Furthermore, the first spectral width value $\Delta v_1$ can be greater than the second spectral width value $\Delta v_2$, and the first emission peak power value $P_1$ can be greater than the second emission peak power value $P_2$. Then, thanks to the first spectral width value $\Delta v_1$ which is increased, value $P_1$ is distributed over an emission spectral interval which is wider than that over which value $P_2$ is distributed. For this reason, value $P_1$ can be greater than the stimulated Brillouin scattering threshold $P_{SBS}$ corresponding to the optical fibers used to create the LIDAR system. Preferably, value $P_2$ can be chosen to be less than or equal to this stimulated Brillouin scattering threshold, in order to limit a loss of energy efficiency in the production of the radiation to be emitted during the second time intervals, of individual durations $\Delta t_2$.

Several LIDAR system architectures in accordance with the invention are now described, which are designed to emit radiation sequences as described above. The description of these architectures is limited to the organization of their main components, it being understood that a person skilled in the art is cognizant of such components, which are commercially available, and will know how to combine them into the described architectures without difficulty or without any need for inventive step. In addition, it is understood that additional components to be used in these architectures, but which are not directly related to the principle of the invention, and which are in common use, are not described for the sake of clarity. All these LIDAR system architectures described below can advantageously be implemented using optical fiber technologies, or integrated optical circuit technologies, for the production of the optical, electro-optical, and interconnection components which are used. In the figures which show emission path architectures, reference number 50 designates an emission controller, which is denoted CTRL and connected to the components of the emission path in order to produce the radiation emission sequence which has the desired characteristics. The control mode to be implemented by this emission controller 50 is within the abilities of those skilled in the art, once the radiation emission sequence to be produced is provided to him.

Figure 3A:
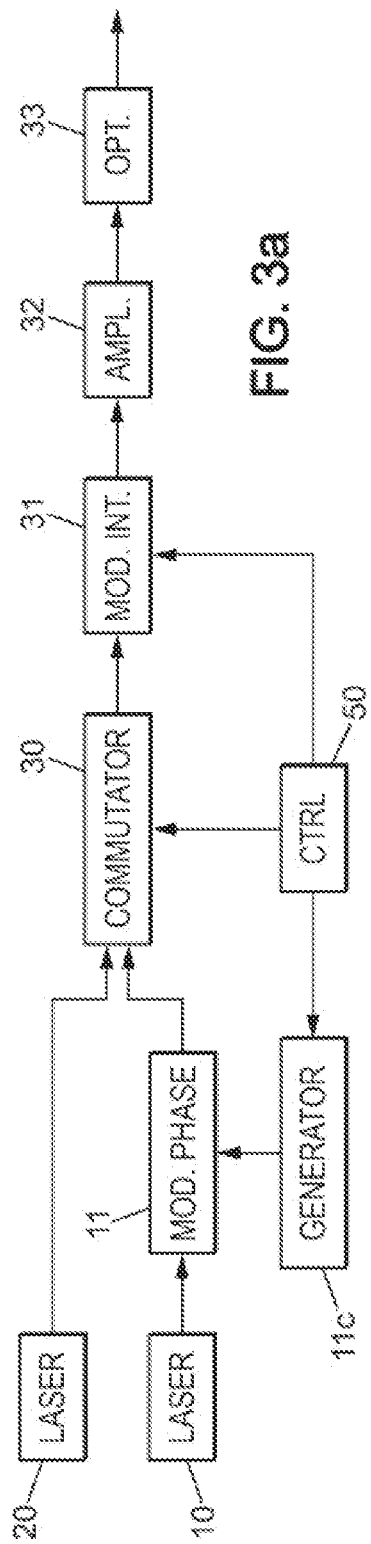
FIG. 3a is a block diagram of an emission path for a LIDAR system according to the invention, which is adapted for producing the first radiation emission sequence of FIG. 1a and FIG. 1b.

FIG. 3a shows a first possible emission path architecture for a LIDAR system according to the invention, which is designed to produce radiation emission sequences in accordance with FIG. 1a and FIG. 1b. Reference number 10 designates a laser source, commonly called a laser oscillator, which is capable of producing a continuous laser beam at optical frequency vi. It may for example be a laser diode or a fiber laser. The laser beam which is produced by the source 10 is sent through a phase modulator 11, denoted MOD. PHASE, which gives it the spectral width $\Delta v_1$. In this case, this is a phase modulation external to the laser source. The phase modulator 11 may be an electro-optic modulator, for example. A random generator of binary signals, as usually known under the acronym PRBS for "Pseudo-Random Binary Sequence", or a radiofrequency noise generator, or else an electric generator of arbitrary waveforms, known under the acronym AWG for "Arbitrary Waveform Generator", may be connected to an electrical control input of the phase modulator 11. The mode used among these alternative control modes of the phase modulator 11 is designated by the reference 11c and denoted GENERATOR. When using a PRBS generator, it produces phase jumps equal to $-\pi$ or $\pi$ in a random or pseudo-random sequence. The output of the phase modulator 11 may then advantageously be associated with an optical apodization filter (not shown) in order to eliminate the secondary lobes that such a spectral broadening method can generate in the spectrum of the radiation which comes directly from the phase modulator 11. In the case of using an AWG generator, the generator can be programmed to produce various waveforms such as a succession of ramps whose slopes are randomly variable between successive ramps. Alternatively, it can be programmed to produce an electrical control signal which is sinusoidal or which is a linear combination of several sinusoidal components. Other forms for the electrical control signals which are intended for the phase modulator 11 can alternatively also be used, it being understood that a person skilled in the art knows how to select the characteristics of such electrical control signals in order to provide the radiation which exits the modulator phase 11 with a desired spectral envelope shape, with spectral width $\Delta v_1$. The generator 11c may be selectively activated by the emission controller 50 to produce pulses 1, or may be continuously activated. Reference number 20 denotes another laser source, i.e. another laser oscillator, which is capable of producing another continuous laser beam which has optical frequency $v_2$, directly with spectral width $\Delta v_2$. For example, the laser source 20 may be of the fiber laser type. Indeed, as spectral width $\Delta v_2$ is low for the invention, it can be supplied directly, or intrinsically, by laser source 20, i.e. without using any additional component specifically dedicated to producing this spectral width value. The two laser sources 10 and 20 constitute the laser source assembly as designated in the general part of this description. The two radiations which respectively originate from the phase modulator 11 and from laser source 20 are then injected into two inputs of an optical switch 30, which is denoted COMMUTATOR.

This may be a 2×1 optical switch which is controlled by the emission controller 50 to output the radiation received at one or the other one of its two inputs, during the first and/or second time intervals, and according to the desired sequence for alternating between the radiation pulses at optical frequency $v_1$ and those at optical frequency $v_2$. Alternatively, the optical switch 30 may be replaced by a fiber optic Y coupler, for example with a 50/50 intensity ratio and optionally polarization-maintaining, or replaced by a polarization coupler, for example of polarizing beamsplitter cube type. Then the radiation as outputted from the optical switch 30 is introduced into an intensity modulator 31, which is denoted MOD. INT. and controlled by the emission controller 50 so that the radiation ultimately emitted toward the measurement zone has instantaneous power value $P_1$ during the first time intervals of durations $\Delta t_1$ where the optical frequency is closer to value $v_1$, and has instantaneous power value $P_2$ during the second time intervals of durations $\Delta t_2$ where the optical frequency is closer to value $v_2$. The intensity modulator 31 may be of the electro-optic, or electro-acoustic, or semiconductor optical amplifier type. As is known, such an intensity modulator may incorporate an internal controller, or may be associated with an external controller which is interposed between this intensity modulator and the emission controller 50. The radiation which originates from the intensity modulator 31 is then transmitted to an optical amplification assembly 32, or to an optical amplification chain 32, denoted AMPL, in order to actually produce the emission optical power values $P_1$ and $P_2$. Finally, the radiation which originates from the optical amplification assembly 32 is transmitted to the measurement zone by output optics 33 of the emission path of the LIDAR system, denoted OPT.

Figure 3B:
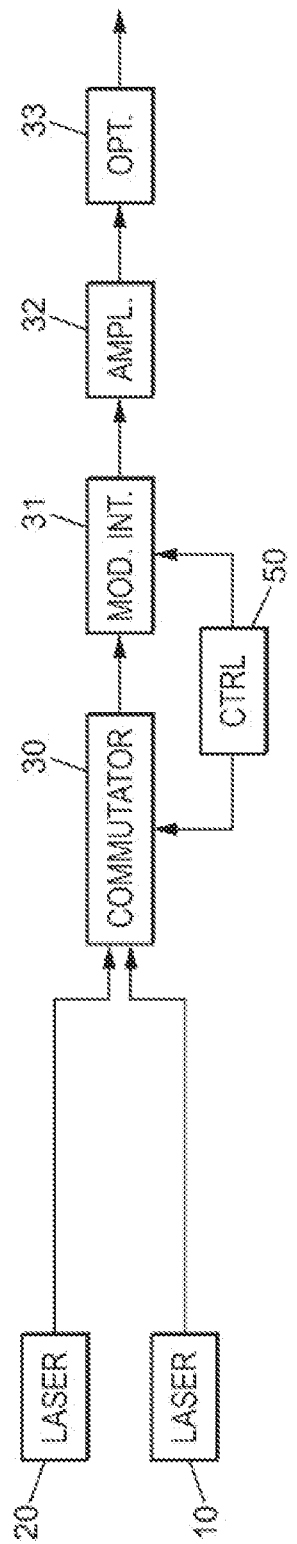
FIG. 3b is a block diagram of a first variant of the emission path compared to the system of FIG. 3a, for another LIDAR system according to the invention, again for producing the first radiation emission sequence of FIG. 1a and FIG. 1b.
Figure 3E:
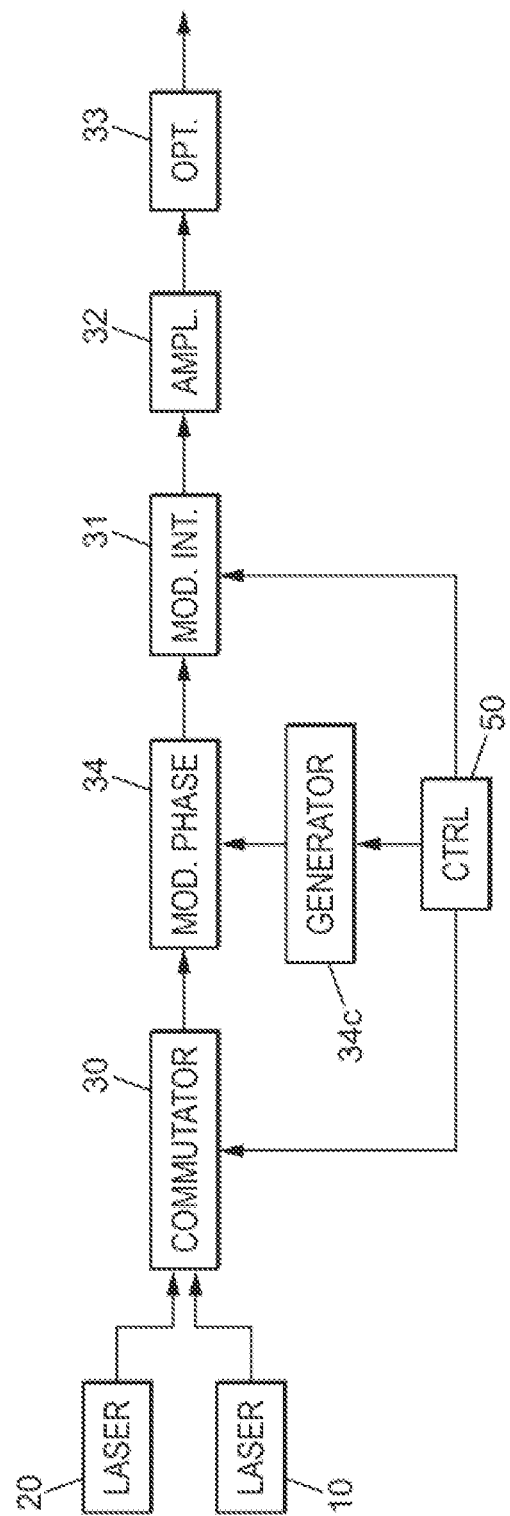
FIG. 3e is a block diagram of a fourth variant of the emission path compared to the system of FIG. 3a, for yet another LIDAR system according to the invention, again for producing the first radiation emission sequence of FIG. 1a and FIG. 1b.

Several alternative architectures of LIDAR systems can be derived from the one in FIG. 3a, each time using at least one of the following equivalence principles, applied to the emission path architecture of FIG. 3a:

if laser source 10 is of a type capable of producing a laser beam at optical frequency $v_1$ directly with spectral width value $\Delta v_1$, such as laser source 20 of FIG. 3a for spectral width value $\Delta v_2$, then the phase modulator 11 can be omitted so that the laser beam from laser source 10 can be transmitted directly to the optical switch 30, as is done for laser source 20. The configuration of FIG. 3b is thus obtained;

when laser source 10 is of a tunable type, the electrical control signal which is used to impart spectral width $\Delta v_1$ to the radiation emitted around optical frequency $v_1$, can be applied directly to a control input of tunable laser source 10. Such a mode of obtaining the desired spectral width is sometimes referred to as internal phase modulation, as opposed to the use of a phase modulator which is external to the laser source as shown in FIG. 3a. Internally modulated laser sources are, for example, laser diodes for which the electric current injected in the gain region can be modulated with a low modulation amplitude, or DBR diodes, for Distributed Bragg Reflector diodes, for which the injection into the phase, grating, or semiconductor optical amplification regions can be modulated. Additionally or alternatively, this method of obtaining the desired spectral width, in a manner internal to the laser source, can also be applied to laser source 20, when the latter is itself of the tunable type, to obtain spectral width $\Delta v_2$. The configuration of FIG. 3c is thus obtained, where the references 11c and 21c designate the modulation signal generators which are connected to the respective control inputs of the tunable laser sources 10 and 20;

two separate external phase modulators can be used simultaneously, one between laser source 10 and the optical switch 30 to give spectral width $\Delta v_1$ to the radiation emitted at optical frequency $v_1$, as in the case of FIG. 3a, and the other between laser source 20 and the optical switch 30 to give spectral width $\Delta v_2$ to the radiation emitted at optical frequency $v_2$. The configuration of FIG. 3d is thus obtained, where the references 11 and 21 designate the two external phase modulators which are respectively associated with laser sources 10 and 20, and the references 11c and 21c designate the phase modulation signal generators which are connected to the respective control inputs of these phase modulators 11 and 21; and a single phase modulator can be used to be effective for the two radiations produced separately at optical frequencies $v_1$ and $v_2$ by laser sources 10 and 20. In this case, the laser beams from the two laser sources 10 and 20 are transmitted directly to the inputs of the optical switch 30, and the single phase modulator is located between the output of the optical switch 30 and the input of the intensity modulator 31. This single phase modulator can then be controlled in one of the ways previously described, to produce spectral width $\Delta v_1$ during the first time intervals where the optical switch 30 transmits radiation which has optical frequency $v_1$, and to produce spectral width $\Delta v_2$ during the second time intervals where the optical switch 30 transmits radiation which has optical frequency $v_2$. The configuration of FIG. 3e is thus obtained, where the reference 34 designates the external phase modulator which is common to the two radiations of optical frequencies $v_1$ and $v_2$, and the reference 34c designates the phase modulation signal generator which is connected to the control input of this phase modulator 34.

Figure 4A:
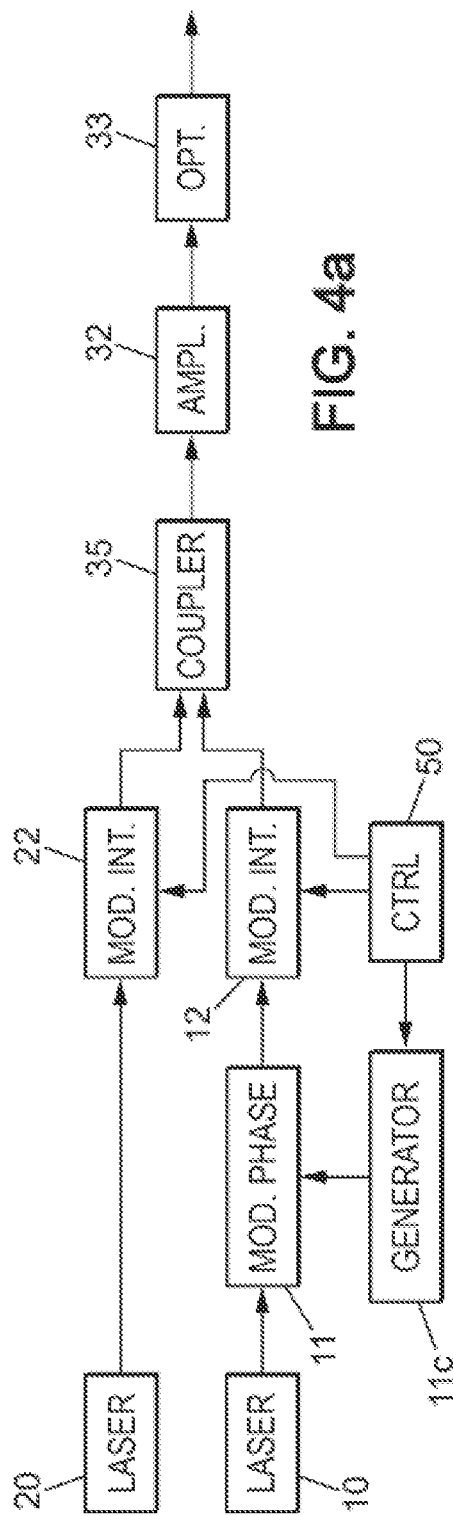
FIG. 4a is a block diagram of an emission path for yet another LIDAR system according to the invention, and which is again adapted for producing the first radiation emission sequence of FIG. 1a and FIG. 1b.

The embodiment of FIG. 4a can be obtained from that of FIG. 3a, by modulating the intensity of the radiation located around optical frequencies $v_1$ and $v_2$ upstream of the union of the separate paths for generating this radiation. The radiation generation path which is located around optical frequency $v_1$ is identical to that of FIG. 3a, while adding an intensity modulator 12. Similarly, the radiation generation path which is located around optical frequency $v_2$ is identical to that of FIG. 3a, while adding an intensity modulator 22. The two intensity modulators 12 and 22 can be controlled by the emission controller 50 in a manner which is temporally correlated with the modulation signal produced by the generator 11c. In particular, they produce transmission time windows which limit the first time intervals, of individual durations $\Delta t_1$, and the second time intervals, of individual durations $\Delta t_2$, to the desired repetition frequency. For such an embodiment, the separate radiation generation paths located around the two optical frequencies $v_1$ and $v_2$ can be combined using a coupler 35, in the direction of the downstream portion of the emission path, which is shared by the two optical frequencies and which comprises the optical amplification assembly 32. The coupler 35 may be a conventional Y coupler. Alternatively, it may be a polarization coupler, which is capable of assigning a determined polarization to the radiation transmitted during the first time intervals, of individual durations $\Delta t_1$, and the orthogonal polarization to the radiation transmitted during the second time intervals, of individual durations $\Delta t_2$. For example, a linear polarization parallel to a fixed direction can be imparted by the polarization coupler 35 to the radiation transmitted during the first time intervals of individual durations $\Delta t_1$, and a linear polarization perpendicular to the fixed direction can be imparted by the polarization coupler 35 to the radiation transmitted during the second time intervals of individual durations $\Delta t_2$.

Figure 4B:
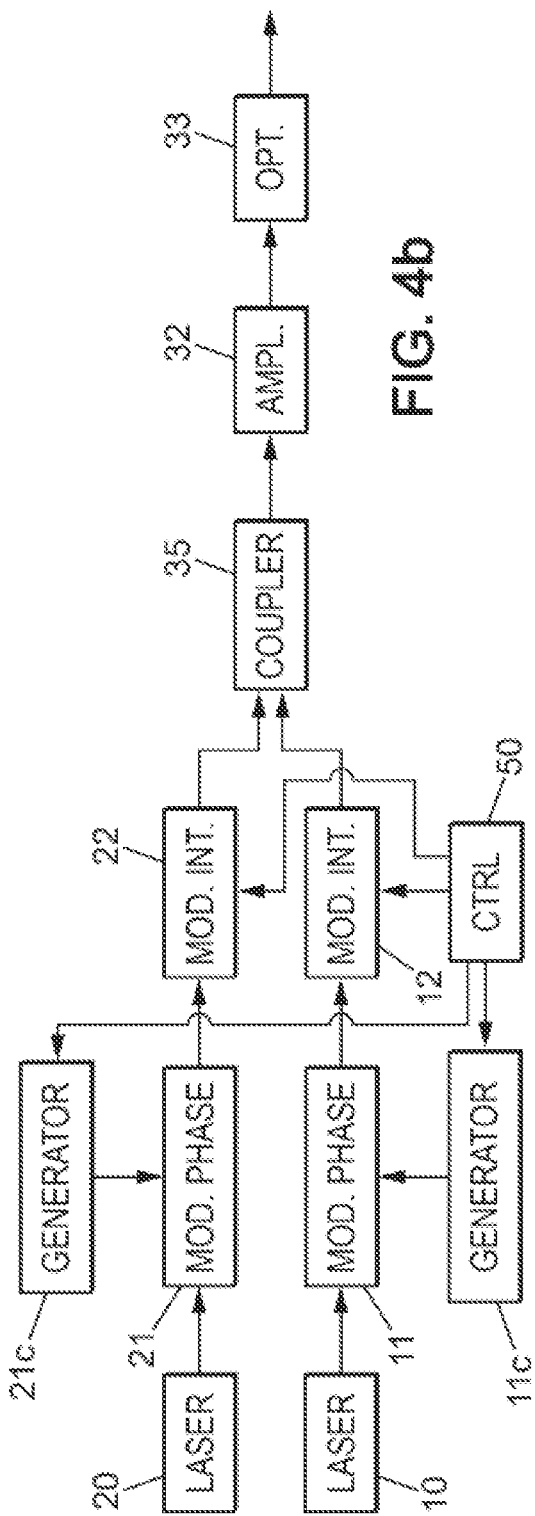
FIG. 4b is a block diagram of a variant of the emission path compared to the system of FIG. 4a, for yet another LIDAR system according to the invention, and which is again adapted for producing the first radiation emission sequence of FIG. 1a and FIG. 1b.

The embodiment in FIG. 4b can be obtained in the same manner as the one in FIG. 4a, but based on the embodiment in FIG. 3d instead of the one in FIG. 3a. By applying the same method, a person skilled in the art will be able to deduce still other possible embodiments for the invention, for example by replacing the single intensity modulator in FIG. 3b, FIG. 3c, or FIG. 3e with two intensity modulators separately dedicated to the radiations located around the two optical frequencies $v_1$ and $v_2$.

All the embodiments in FIG. 3a-FIG. 3e and FIG. 4a-FIG. 4b are suitable for producing radiation emission sequences in accordance with FIG. 1a and FIG. 1b.

Unlike the embodiments of FIG. 3a-FIG. 3e and FIG. 4a-FIG. 4b, the phase modulation which is used in the embodiments of FIG. 5a and FIG. 5b to obtain the desired spectral widths $\Delta v_1$ and $\Delta v_2$ separately during the time intervals of durations $\Delta t_1$ and $\Delta t_2$, is shared for the two optical frequencies $v_1$ and $v_2$. It is then possible to use a single phase modulator, which is then located downstream of the optical switch or of the optical coupler which groups together, in the shared downstream portion of the emission path, the beams coming separately from the two laser sources 10 and 20. A cost reduction can thus be obtained for the LIDAR system.

These embodiments of FIG. 5a and FIG. 5b are suitable for producing radiation emission sequences in accordance with FIG. 2a and FIG. 2b.

In the embodiment of FIG. 5a, the phase modulation and the intensity modulation are both performed downstream of the union of the optical paths of the radiations coming separately from laser sources 10 and 20. This union of the optical paths is implemented by the switch 30, the phase modulation is produced by the phase modulator 34, and the intensity modulation is produced by the intensity modulator 31. The phase modulation signal generator 34c can again be of one of the types presented above: PRBS generator, RF noise generator, or AWG generator. The switch 30, phase modulation signal generator 34c, and intensity modulator 31 can all be synchronously controlled by the emission controller 50.

In the embodiment of FIG. 5b, the radiations which emanate separately from laser sources 10 and 20 are intensity-modulated using two separate modulators, which are designated by the references 12 and 22. The intensity-modulated radiations which emanate therefrom may be introduced by a coupler 35 in the shared downstream portion of the emission path. The coupler 35 may again be a Y coupler or a polarization coupler as indicated above. The downstream portion of the emission path then comprises the phase modulator 34, the optical amplification assembly 32, and the output optics 33.

Figure 6A:
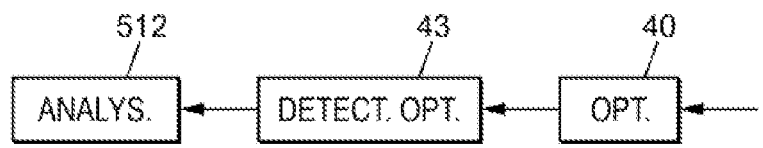
FIG. 6a is a block diagram of a detection path of a LIDAR system according to the invention.

FIG. 6a shows a first detection path architecture which may be used in a LIDAR system according to the invention. The reference 40 designates the input optics, denoted OPT., of the detection path. Their function is to collect part of the backscattered radiation that corresponds to the radiation emission sequence produced by the LIDAR system. This collected part of the radiation is directed onto an optical sensor 43, denoted DETECT. OPT., which produces an electrical detection signal whose intensity is a function of the power of the part of the radiation that is detected. The optical sensor 43 may be implemented in a direct detection mode, or in a coherent detection mode. An optical sensor with direct detection may be composed of a photodiode which is associated with a transimpedance amplifier, for example. An optical sensor with coherent detection, also called heterodyne detection, requires mixing the backscattered radiation collected by the input optics 40 with part of the radiation produced by the laser source assembly. The electrical output of the optical sensor 43 is connected to the input of an analysis chain 512, denoted ANALYS., which processes the electrical signals delivered by the sensor 43 regardless of whether each electrical signal corresponds to pulse 1 or 2.

FIG. 6b shows a second detection path architecture which uses two distinct analysis chains which are separately dedicated to radiation pulses 1 and to radiation pulses 2. An electrical switch 44, denoted COMM. ELEC., then directs the electrical detection signal to two separate analysis chains 51 and 52, denoted ANALYS. 1 and ANALYS. 2, according to the parts of the detection electrical signal which separately correspond to first or second time intervals in the radiation emission sequence. To this purpose, synchronization of the operation of the electrical switch 44 may be controlled by the emission controller 50. Thus, analysis chain 51 may be dedicated to the first time intervals of individual durations $\Delta t_1$, and designed to determine the residual absorption of the measurement zone outside the spectral absorption band of the chemical compound whose amount is to be determined, and to determine the separation distance from the obstacle which is located in the background of this measurement zone. Independently, analysis chain 52 may be dedicated to the second time intervals of individual durations $\Delta t_2$, and designed to determine the absorption of the measurement zone in the spectral absorption band of the chemical compound. A calculation module, not shown, produces an evaluation of the amount of the chemical compound, as a function of the absorption levels determined by the two analysis chains 51 and 52 and of the separation distance from the background obstacle.

FIG. 6c shows a third possible detection path architecture, in which two optical sensors 41 and 42, denoted DETECT. OPT. 1 and DETECT. OPT. 2, separately produce electrical detection signals which are transmitted separately to analysis chains 51 and 52. An advantage of this third architecture is the possibility of using optical sensors 41 and 42 of different sensitivity levels and separately adapted to the respective instantaneous power values of the relevant parts of the backscattered radiation: $P_1$ in the first time intervals of individual durations $\Delta t_1$ for sensor 51, and $P_2$ in the second time intervals of individual durations $\Delta t_2$ for sensor 52. In this case, the backscattered radiation collected by the input optics 40 is directed towards sensor 41 or sensor 42 by an optical switch 45. The operation of this optical switch 45 is controlled by the emission controller 50. For this third detection path architecture, the coupler 35 of the emission path can be of the Y coupler type with a 50/50 ratio.

The three architectures of FIG. 6a-FIG. 6c for the detection path are each compatible with the architecture variants of FIG. 3a-FIG. 3e, FIG. 4a-FIG. 4b, and FIG. 5a-FIG. 5b for the emission path.

Finally, FIG. 6d shows a fourth possible detection path architecture, in which the optical switch 45 of [FIG. 6c] is replaced by a polarizing beamsplitter 46, denoted SEP. POLAR., which is based on linear polarizations of the radiation. This fourth architecture for the detection path is compatible with the embodiments for the emission path where the coupler 35 is of the polarization coupler type, as described above.

In general, the optical sensor or at least one of the optical sensors used in the detection path has a sufficiently short response time to allow estimating the separation distance from the background obstacle based on the radiation emitted during durations $\Delta t_1$.

In addition, the output of each analysis chain of the detection path may be connected to a computing unit (not shown), which is adapted for supplying estimates, based on signals produced by the one or two analysis chains, of the separation distance from the background obstacle and of the amount of the chemical compound which is present in the measurement zone, integrated over the path of the pulses. Such a computing unit may optionally be integrated into the LIDAR system.

It is understood that the invention can be reproduced while modifying secondary aspects of the embodiments described in detail above, but still retaining at least some of the cited advantages. In particular, optical components with equivalent functions may be used instead of those which have been mentioned. In addition, the following modifications are mentioned as examples of alternatives available to those skilled in the art without any inventive step:

one same optical frequency-switching laser source may be used to produce the pulses at optical frequencies $v_1$ and $v_2$;

separate optical amplifiers may be used for the pulses at optical frequency $v_1$ and those at optical frequency $v_2$;

the interlacing of pulses at optical frequency $v_1$ with those at optical frequency $v_2$ in order to produce the radiation emission sequence may be performed before or after the application of phase modulation and/or intensity modulation to each pulse; and the interlacing of pulses at optical frequency $v_1$ with those at optical frequency $v_2$ in order to produce the radiation emission sequence may be performed before or after optical amplification of the pulses.

Finally, all numerical values that have been cited were only for illustration, and may be changed according to the chemical compound whose amount is to be determined.

The invention claimed is:

1. A LIDAR (Light Detection and Ranging) system, adapted for performing differential absorption measurements between two distinct optical frequencies, and measurements of a separation distance from an obstacle which is present in a background of a measurement zone where the absorption occurs, the LIDAR system comprising:

a laser source assembly, suitable for producing radiations at either of the two optical frequencies;

intensity modulation means, adapted for applying a pulse envelope shape to each radiation, including a pulse duration and a pulse optical power value; and an emission controller, adapted for controlling the intensity modulation means, the LIDAR system being adapted so that, during an operation of the LIDAR system, said LIDAR system emits, in a target direction in which a measurement of differential absorption and a measurement of the separation distance from the background obstacle are to be performed, a radiation emission sequence which comprises:

first time intervals during which the radiation emission is spectrally located at a first of the two optical frequencies, with a first spectral width, a first pulse duration, and a first pulse optical power value; and second time intervals during which the radiation emission is spectrally located at a second of the two optical frequencies, with a second spectral width, a second pulse duration, and a second pulse optical power value, the first and second spectral widths being such that the radiation emission during the first time intervals and during the second time intervals corresponds to spectral intervals which are disjoint, the first spectral width being greater than the second spectral width, the first pulse optical power value being greater than the second pulse optical power value, and the first pulse duration being shorter than the second pulse duration, the LIDAR system further comprising a detection path which is adapted for independently detecting, processing, and analyzing backscattered radiations which correspond to the first optical frequency and to the second optical frequency, and which respectively correspond to emissions during the first and second time intervals.

2. The LIDAR system according to claim 1, further comprising:

spectral broadening means, arranged to modify a spectral width of at least one of the radiations produced by the laser source assembly.

3. The LIDAR system according to claim 2, wherein the emission controller is adapted for controlling the laser source assembly and intensity modulation means, so that, in the radiation emission sequence, the first of the two optical frequencies is associated exclusively with the first spectral width, the first pulse duration, and the first pulse optical power value, excluding the second spectral width, the second pulse duration, and the second pulse optical power value, within first radiation pulses, and the second of the two optical frequencies is associated exclusively with the second spectral width, the second pulse duration, and the second pulse optical power value, excluding the first spectral width, the first pulse duration, and the first pulse optical power value, within second radiation pulses which are separate from said first pulses.

4. The LIDAR system according to claim 3, wherein the laser source assembly comprises a first laser oscillator which is adapted for producing the radiation at the first optical frequency, and a second laser oscillator which is suitable for producing the radiation at the second optical frequency with the second spectral width, the spectral broadening means comprise a phase modulator which is arranged in a path of the radiation produced by the first laser oscillator, and which is controlled by the emission controller to provide the first width spectral to said laser radiation produced by the first laser oscillator; and the LIDAR system further comprises an optical switch which is controlled by the emission controller to transmit either the radiation originating from the phase modulator or the radiation produced by the second laser oscillator, to an emission optical path downstream portion which is shared by said radiations originating from the phase modulator and produced by the second laser oscillator, said emission optical path downstream portion comprising the intensity modulation means.

5. A method for measuring an amount of a chemical compound which is present in a target direction, wherein:

the LIDAR system in accordance with claim 4 is selected, such that the chemical compound has an absorption capacity value which is lower at the first optical frequency than at the second optical frequency;

the LIDAR system is oriented in the target direction in order to emit radiation according to the radiation emission sequence towards a measurement zone which is likely to contain the chemical compound, and an operation of the LIDAR system is triggered;

the separation distance from the obstacle which is present in the background of the measurement zone is estimated based on the backscattered radiation relating to the first optical frequency and which corresponds to emissions during the first time intervals; and the amount of the chemical compound which is contained in the measurement zone, integrated over a path of the pulses between the LIDAR system and the background obstacle, is estimated based on intensity values relating separately to the backscattered radiations at the first optical frequency and at the second optical frequency, respectively corresponding to the first and second time intervals in the radiation emission sequence, said backscattered radiations having been detected by the detection path of the LIDAR system.

6. The LIDAR system according to claim 3, wherein the laser source assembly comprises a first laser oscillator which is adapted for producing the radiation at the first optical frequency, and a second laser oscillator which is adapted for producing the radiation at the second optical frequency with the second spectral width, the spectral broadening means comprises a phase modulator which is arranged in a path of the radiation produced by the first laser oscillator, and which is controlled by the emission controller to provide the first spectral width to said radiation produced by the first laser oscillator, the intensity modulation means comprise a first intensity modulator which is arranged in a path of the radiation originating from the phase modulator, and which is controlled by the emission controller to be effective on said radiation originating from the phase modulator, and comprise a second intensity modulator which is arranged in a path of the radiation produced by the second laser oscillator, and which is controlled by the emission controller to be effective on said radiation produced by the second laser oscillator, and the LIDAR system further comprises an optical coupler adapted for transmitting the radiations originating from the first and second intensity modulators to an emission optical path downstream portion which is shared by said radiations originating from the first and second intensity modulators.

7. A method for measuring an amount of a chemical compound which is present in a target direction, wherein:

the LIDAR system in accordance with claim 5 is selected, such that the chemical compound has an absorption capacity value which is lower at the first optical frequency than at the second optical frequency;

the LIDAR system is oriented in the target direction in order to emit radiation according to the radiation emission sequence towards a measurement zone which is likely to contain the chemical compound, and an operation of the LIDAR system is triggered;

the separation distance from the obstacle which is present in the background of the measurement zone is estimated based on the backscattered radiation relating to the first optical frequency and which corresponds to emissions during the first time intervals; and the amount of the chemical compound which is contained in the measurement zone, integrated over a path of the pulses between the LIDAR system and the background obstacle, is estimated based on intensity values relating separately to the backscattered radiations at the first optical frequency and at the second optical frequency, respectively corresponding to the first and second time intervals in the radiation emission sequence, said backscattered radiations having been detected by the detection path of the LIDAR system.

8. A method for measuring an amount of a chemical compound which is present in a target direction, wherein:

the LIDAR system in accordance with claim 3 is selected, such that the chemical compound has an absorption capacity value which is lower at the first optical frequency than at the second optical frequency;
the LIDAR system is oriented in the target direction in order to emit radiation according to the radiation emission sequence towards a measurement zone which is likely to contain the chemical compound, and an operation of the LIDAR system is triggered;
the separation distance from the obstacle which is present in the background of the measurement zone is estimated based on the backscattered radiation relating to the first optical frequency and which corresponds to emissions during the first time intervals; and
the amount of the chemical compound which is contained in the measurement zone, integrated over a path of the pulses between the LIDAR system and the background obstacle, is estimated based on intensity values relating separately to the backscattered radiations at the first optical frequency and at the second optical frequency, respectively corresponding to the first and second time intervals in the radiation emission sequence, said backscattered radiations having been detected by the detection path of the LIDAR system.

9. The LIDAR system according to claim 2, wherein the emission controller is adapted for controlling the laser source assembly, the spectral broadening means, and the intensity modulation means, so that the radiation emission sequence comprises a succession of radiation pulses which are spectrally located either at the first of the two optical frequencies, or at the second of the two optical frequencies, all the radiation pulses having the same envelope shape which comprises, for the first optical frequency as for the second optical frequency, the first duration during which the radiation emission has the first spectral width and the first pulse optical power value, and a second duration during which the radiation emission has the second spectral width and the second pulse optical power value, the first duration being shorter than the second duration, and being before or after said second duration in each radiation pulse.

10. A method for measuring an amount of a chemical compound which is present in a target direction, wherein:
the LIDAR system in accordance with claim 6 is selected, such that the chemical compound has an absorption capacity value which is lower at the first optical frequency than at the second optical frequency;
the LIDAR system is oriented in the target direction in order to emit radiation according to the radiation emission sequence towards a measurement zone which is likely to contain the chemical compound, and an operation of the LIDAR system is triggered;
the separation distance from the obstacle which is present in the background of the measurement zone is estimated based on the backscattered radiation relating to the first optical frequency and which corresponds to emissions during the first time intervals; and
the amount of the chemical compound which is contained in the measurement zone, integrated over a path of the pulses between the LIDAR system and the background obstacle, is estimated based on intensity values relating separately to the backscattered radiations at the first optical frequency and at the second optical frequency, respectively corresponding to the first and second time intervals in the radiation emission sequence, said backscattered radiations having been detected by the detection path of the LIDAR system.

11. A method for measuring an amount of a chemical compound which is present in a target direction, wherein:
the LIDAR system in accordance with claim 2 is selected, such that the chemical compound has an absorption capacity value which is lower at the first optical frequency than at the second optical frequency;
the LIDAR system is oriented in the target direction in order to emit radiation according to the radiation emission sequence towards a measurement zone which is likely to contain the chemical compound, and an operation of the LIDAR system is triggered;
the separation distance from the obstacle which is present in the background of the measurement zone is estimated based on the backscattered radiation relating to the first optical frequency and which corresponds to emissions during the first time intervals; and
the amount of the chemical compound which is contained in the measurement zone, integrated over a path of the pulses between the LIDAR system and the background obstacle, is estimated based on intensity values relating separately to the backscattered radiations at the first optical frequency and at the second optical frequency, respectively corresponding to the first and second time intervals in the radiation emission sequence, said backscattered radiations having been detected by the detection path of the LIDAR system.

12. The LIDAR system according to claim 1, implementing an optical fiber technology.

13. The LIDAR system according to claim 1, comprising polarization means adapted so that the radiations emitted toward the measurement zone by said LIDAR system have polarizations which are orthogonal when said radiations are emitted during the first time intervals or the second time intervals,
and the detection path comprises a polarizing beamsplitter which is arranged to transmit the backscattered radiations, as a function of the polarizations of said backscattered radiations, either to a first detector which is sensitive in a first spectral interval including the first optical frequency combined with the first spectral width, or to a second detector which is sensitive in a second spectral interval including the second optical frequency combined with the second spectral width.

14. A method for measuring an amount of a chemical compound which is present in a target direction, wherein:
the LIDAR system in accordance with claim 1 is selected, such that the chemical compound has an absorption capacity value which is lower at the first optical frequency than at the second optical frequency;
the LIDAR system is oriented in the target direction in order to emit radiation according to the radiation emission sequence towards a measurement zone which is likely to contain the chemical compound, and an operation of the LIDAR system is triggered;
the separation distance from the obstacle which is present in the background of the measurement zone is estimated based on the backscattered radiation relating to the first optical frequency and which corresponds to emissions during the first time intervals; and
the amount of the chemical compound which is contained in the measurement zone, integrated over a path of the pulses between the LIDAR system and the background obstacle, is estimated based on intensity values relating separately to the backscattered radiations at the first optical frequency and at the second optical frequency, respectively corresponding to the first and second time intervals in the radiation emission sequence, said backscattered radiations having been detected by the detection path of the LIDAR system.

15. The method according to claim 14, wherein the separation distance from the obstacle which is present in the background of the measurement zone is estimated based on a time-of-flight which is measured for the backscattered radiation relating to the first optical frequency.

16. The method according to claim 15, wherein the separation distance from the obstacle which is present in the background of the measurement zone, as estimated based on the backscattered radiation relating to the first optical frequency, is used to estimate the amount of the chemical compound which is contained in the measurement zone, in combination with the intensity values separately relating to the backscattered radiations detected at the first optical frequency and at the second optical frequency, and respectively corresponding to the emissions during the first and second time intervals.

17. The method according to claim 14, wherein the chemical compound is any among carbon dioxide, methane, nitrous oxide, and water.

18. The method according to claim 14, wherein the LIDAR system is installed at the surface of the Earth and directed to measure the amount of the chemical compound which is present between said LIDAR system and the obstacle,
- or the LIDAR system is on board an aircraft in flight, and directed towards a geographical area at the surface of the Earth, to measure the separation distance from the surface of the Earth in said geographical area relative to the LIDAR system, and to measure the amount of the chemical compound which is present between said LIDAR system and the surface of the Earth in said geographical area,
- or the LIDAR system is on board a satellite in orbit around the Earth and directed towards a geographical area at the surface of the Earth, to measure the separation distance from the surface of the Earth in said geographical area relative to the LIDAR system, and to measure the amount of the chemical compound which is present between said LIDAR system and the surface of the Earth in said geographical area.

19. The LIDAR system according to claim 1, wherein the emission controller is adapted for controlling the laser source assembly and the intensity modulation means, so that, in the radiation emission sequence, the first of the two optical frequencies is associated exclusively with the first spectral width, the first pulse duration, and the first pulse optical power value, excluding the second spectral width, the second pulse duration, and the second pulse optical power value, within first radiation pulses, and the second of the two optical frequencies is associated exclusively with the second spectral width, the second pulse duration, and the second pulse optical power value, excluding the first spectral width, the first pulse duration, and the first pulse optical power value, within second radiation pulses which are separate from said first pulses.

20. The LIDAR system according to claim 1, comprising polarization means adapted so that the radiations emitted toward the measurement zone by said LIDAR system have circular polarizations which are opposite when said radiations are emitted during the first time intervals or the second time intervals,
and the detection path comprises a polarizing beamsplitter which is arranged to transmit the backscattered radiations, as a function of the polarizations of said backscattered radiations, either to a first detector which is sensitive in a first spectral interval including the first optical frequency combined with the first spectral width, or to a second detector which is sensitive in a second spectral interval including the second optical frequency combined with the second spectral width.

* * * * *